Sept. 29, 1953 N. C. PRICE 2,653,446
COMPRESSOR AND FUEL CONTROL SYSTEM FOR HIGH-PRESSURE
GAS TURBINE POWER PLANTS
Filed June 5, 1948 3 Sheets-Sheet 1
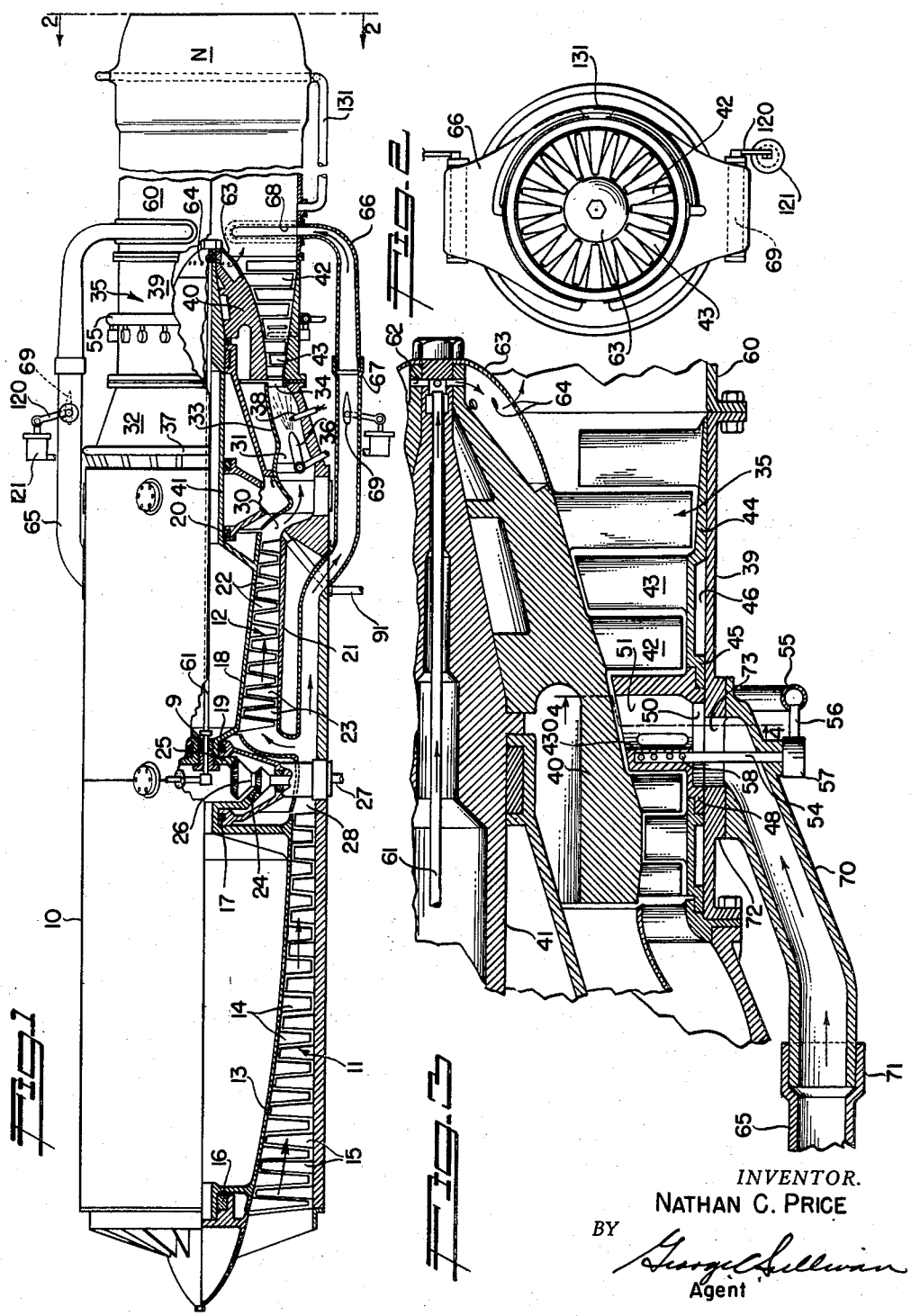
INVENTOR.
NATHAN C. PRICE
BY
Agent

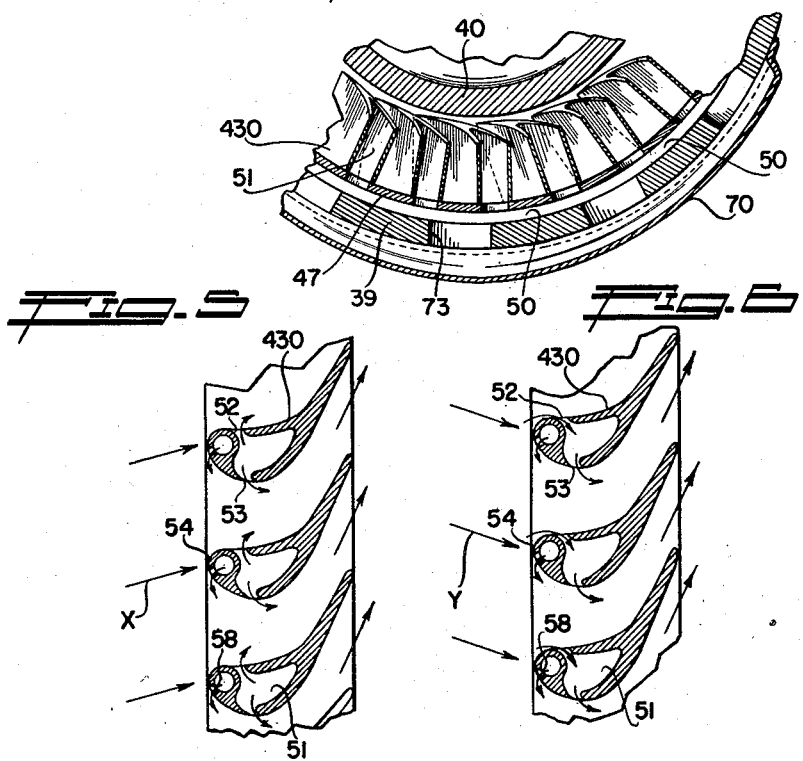

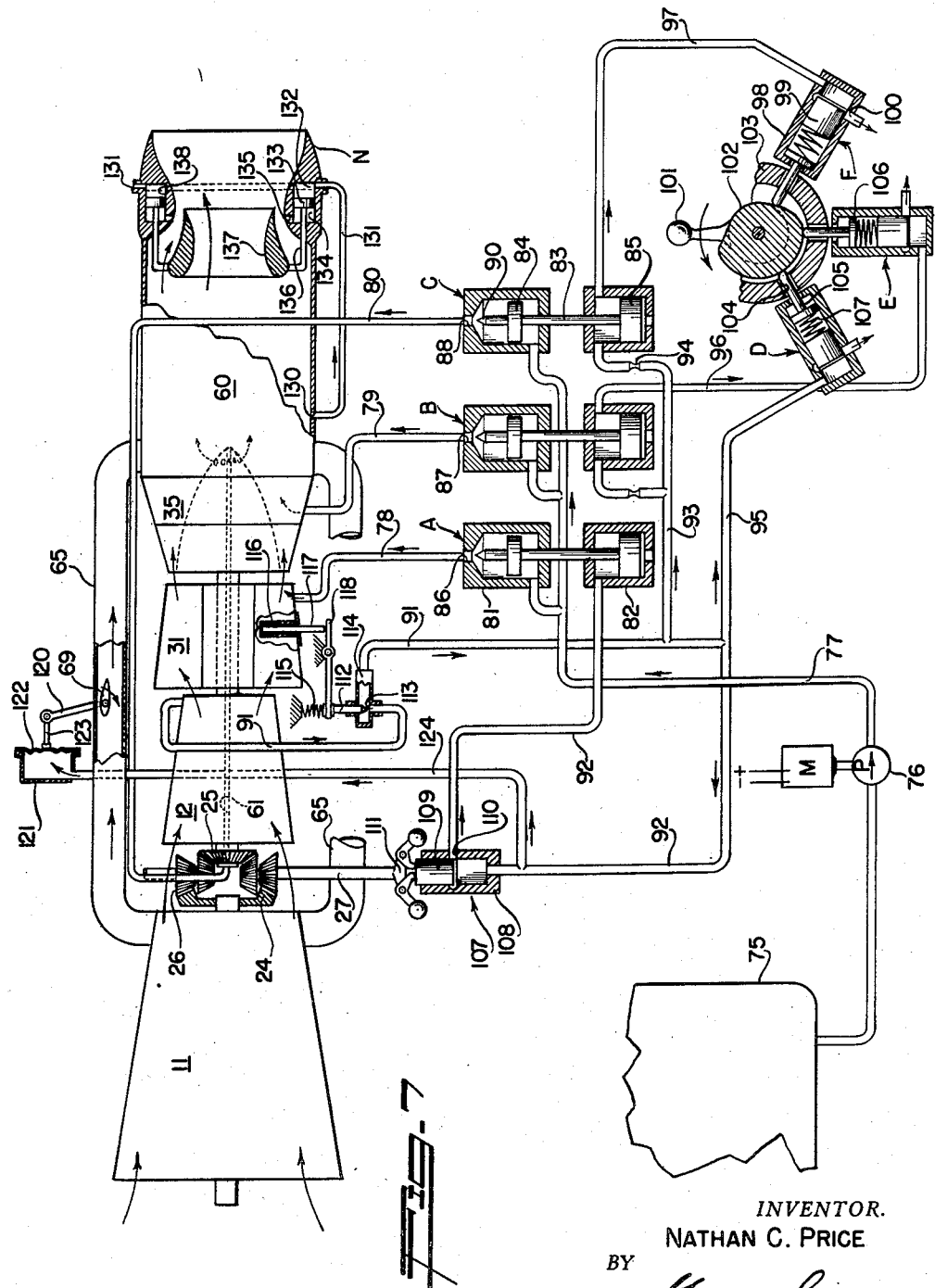

Patented Sept. 29, 1953

2,653,446

UNITED STATES PATENT OFFICE 2,653,446

COMPRESSOR AND FUEL CONTROL SYSTEM FOR HIGH-PRESSURE GAS TURBINE POWER PLANTS

Nathan C. Price, St. Helena, Calif., assignor to Lockheed Aircraft Corporation, Burbank, Calif.

Application June 5, 1948, Serial No. 31,348

12 Claims. (Cl. 60—35.6)

This invention relates to internal combustion gas turbine power plants and relates more particularly to means for controlling the compressors and fuel supply systems of such power plants intended for the propulsion of aircraft.

Gas turbine power plants designed for the propulsion of aircraft must operate under widely varying altitude pressures and at different speeds, that is they must operate efficiently at relatively slow speeds at approximately sea level altitudes as well as at high speeds at altitudes of, say, 30,000 feet. Where axial flow compressors are employed much difficulty is encountered in maintaining the correct relationship between the volumetric rate of air flow and the rotational speed generally termed the Q/N ratio. For example, at relatively low altitudes of flight where the air is dense, the first stages of compression tend to become overloaded while the rear or high pressure stages tend to turbine. The turbines of the engines are designed to operate within a given Q/N range and where the compressor output fluctuates excessively due to ambient air pressure conditions, etc., the efficiency of the turbine is correspondingly adversely affected. The difficulty may be alleviated by regulating the speed of the low pressure stages of the compressor system or by regulating the angle of attack of the low pressure compressor impeller blades. Both of these expedients involve rather heavy and expensive modifications of the compressors and where the blading angles are regulable extremely complicated mechanisms and controls must be employed. Furthermore, such regulation of the speed or angle of attack of the low pressure blading does not of itself maintain or regulate the turbine temperatures or the air-fuel ratio required for efficient power plant operation.

It is an object of the present invention to provide a simple, reliable, and inexpensive system for maintaining the substantially correct Q/N ratio in the compressor and turbine of a high pressure gas turbine power plant. The system of the present invention does not require expensive or complicated modification of the compressors but on the other hand is characterized by simple by-pass ducts leading from an intermediate point in the compressor system to either the turbine or the turbine exhaust pipe.

Another object of the invention is to provide a system of the character mentioned in which valves for controlling the compressor by-pass ducts are operated in response to a rotational speed governor so that the quantity of air being by-passed from the intermediate point of the compressor system to the turbine or turbine exhaust is a function of the rotational speed of the compressor and turbine. Thus the speed responsive governor and the by-pass valves regulated thereby serve to automatically maintain the substantially correct volumetric rate of air flow and rotational speed ratio during operation of the plant under varying conditions.

Another object of the invention is to provide a system of the character referred to incorporating a manually regulable fuel supply organization for selectively delivering fuel to the expansion chamber of the turbine and to a supplemental combustion zone at the exit of the expansion chamber for increased power output while maintaining the delivery of fuel to the primary combustion chamber. The system of the invention is adapted for the control of a turbo power plant having a primary combustion chamber between the discharge of the compressor system and the turbine, an intermediate fuel injection means at the expansion zone of the turbine, and a supplemental fuel injection means in the tail pipe, and the system embodies a manual control lever or the equivalent that may be operated to provide for the variable delivery of fuel to these three areas as the conditions of operation of the power plant require. Furthermore, the control lever, or the equivalent, is also operable to gradually open the valves of the compressor by-pass duct as the fuel flow settings are reduced below the value of full primary fuel injection thereby relating the volume of air by-passed around the second stage compressor and primary combustion chamber to the volume of the fuel injected to preserve the correct relationship between the Q/N ratio and the air-fuel ratio.

A further object of the invention is to provide the control system of the character herein described embodying means responsive to the temperature in the turbine for automatically regulating the air-fuel ratio and to limit the temperature developed in the turbine.

Other objectives and advantages will become apparent from the following detailed description of a typical preferred embodiment throughout which description reference will be made to the accompanying drawings in which:

Figure 1 is a side elevation of a gas turbine power plant embodying features of one form of the invention with the lower portion of the power plant appearing in longitudinal cross section;

Figure 2 is an end view of the engine taken substantially as indicated by line 2—2 on Figure 1;

Figure 3 is an enlarged fragmentary, longitudinal sectional view of the turbine portion of the engine illustrating the intermediate and supplemental fuel injection means and a portion of the compressed air by-pass system of another form of the invention;

Figure 4 is an enlarged fragmentary transverse sectional view taken substantially as indicated by line 4—4 on Figure 3;

Figure 5 is a developed sectional view of a row of turbine stator blades employed for the injection of fuel and compressed air in the structure of Figure 3 with arrows indicating the direction of flow of the propellent gases and air during the low speed turbine operation;

Figure 6 is a view similar to Figure 5 with the arrows indicating the direction of flow during higher turbine speed operation; and Figure 7 is a diagrammatic view illustrating the control system of the invention as applied to the power plant of Figure 1.

In the drawings I have illustrated the invention associated with or incorporated in a gas turbine power plant having first and second stage axial flow compressors, an annular combustion chamber, a multistage turbine, and a turbine exhaust nozzle for producing a propulsive jet of the combustion gases and compressed air. It is to be understood that the invention may be applied to or embodied in power plants of this general class varying considerably in design, construction and power output rating and, therefore, the invention is not to be construed as limited to the specific power plant or other details illustrated.

The power plant includes a compressor housing 10 containing the first and second stage compressors 11 and 12. The forward end of the housing 10 is open to receive the rammed air and the housing is a generally cylindrical tubular assembly. The first stage compressor 11 includes a hollow rotor 13 which gradually increases in diameter in the rearward direction and which carries a multiplicity of rows of impeller blades 14. The impellers 14 operate between rows of stator blades 15 secured in the housing 10. The opposite ends of the rotor 13 are carried in suitable bearings 16 and 17 so that the rotor rotates coaxially in the housing 10.

The second stage compressor 12 includes a rotor 18 mounted in the housing 10 in axial alignment with the first stage compressor rotor 13. Spaced bearings 19 and 20 carry the rotor 18 for rotation. The rotor 18 is of rearwardly inceasing diameter and is spaced within an annular or tubular wall 21. A plurality of rows of impeller blades 22 on the rotor 18 operate between rows of stator blades 23 on the wall 21. Bevel gears 24 and 25 are secured to the adjacent opposing ends of the rotors 13 and 18 respectively and cluster pinions 26, carried by radial shafts 27, mesh with the gears to provide a speed reducing drive between the two compressors. An annular duct 28 leads from the discharge of the first stage compressor 11 to the inlet of the second stage compressor 12 and an annular duct 30 leads from the outlet of the second stage compressor 12 to the primary combustion chamber 31.

The primary combustion chamber 31 is an annular enclosure defined by the wall of a rearwardly tapering casing 32 and a shroud or wall 33 spaced within the casing. The forward end of the chamber 31 receives the compressed air from the high pressure compressor duct 30 while the rear end of the chamber discharges through a nozzle ring 34 into the turbine 35. Fuel injecting jets 36 are arranged in the forward portion of the combustion chamber 31 and are supplied with fuel by an annular manifold 37 extending around the chamber. One or more electrical igniters 38 extend into the combustion chamber to ignite the fuel.

The turbine 35 includes a substantially cylindrical casing 39 extending rearwardly from the combustion chamber casing 32 and the turbine rotor 40 operates within the casing 39. The rotor 40 is fixed to a central tubular shaft 41 extending rearwardly from the second stage compressor rotor 18. As best illustrated in Figures 1 and 3, the turbine rotor 40 is of rearward diminishing external diameter and its periphery is spaced from the turbine casing 39 to leave an expansion zone of rearwardly increasing capacity. A plurality of rows of hollow impeller blades or buckets 42 of heat resistant, high strength material, project from the rotor 40 and operate between rows of stator blades 43 projecting inwardly from the wall of the casing 39. The first row of blades 42 are preferably of the impulse type while the other blades 42 are of the reaction type and have cambered airfoil sections. The intermediates or stator blades 43 are stationarily mounted to project radially inward into the turbine expansion zone.

In the embodiment of the invention shown in Figure 3, one of the intermediate rows of stator blades 43 is of special construction to provide for the introduction into the expansion zone of both fuel and bypassed compressed air from the compressor system, it being understood that the invention contemplates the introduction of fuel at one row of stator blades 43 and introduction of compressed air at either the same or another row of blades. The special row of stator blades, which I will designate 430, may be the third stage intermediates, that is the stator blades projecting into the space between the second and third rows of turbine impeller blades 42. The blades 43 have their roots welded or otherwise fixed to cylindrically curved plates 44 which conform generally with the internal surface of the casing 39. The circumferential margins of the plates 44 have stepped rims 45 which space the plates from the surface of the casing to leave insulating air spaces 46. The fuel and air introducing blades 430 are likewise carried by a plate or ring 47 having similar marginal rims 48 which mate with the stepped rims 45 of the plates 44 and which cooperate with the casing 39 to space the ring 47 from the casing and leave an annular air space 50.

The stator blades 430 are hollow, each having an internal cavity or passage 51 which extends from the blade tip to the air space 50. As will be later described compressed air from an intermediate point in the compressor system 11—12 is supplied to the annular space 50 under certain conditions of operation of the power plant and this air flows out through the passages 51 of the blades 430 to discharge at the blade tips. The blades 430 are further provided with slots 52 and 53 in their concave and convex sides respectively. The slots 52 and 53 serve to discharge the compressed air from the blade passages 51 into the turbine expansion zone. As best illustrated in Figures 5 and 6 the slots 52 and 53 are located in the leading edge portions of the blades 430, the slots 52 being somewhat closer to the leading edges than the slots 53. The slots 53 are shaped and located to direct the compressed air rearwardly and laterally as indicated by the arrows in Figures 5 and 6, and are nozzle like apertures being somewhat restricted at their exit. The slots 52 in the concave side of the blades 430 face laterally and somewhat forwardly or toward the leading edges of the blades. The leading edge portion of each blade 430 has an axially extending tubular portion or tube 54 and the rear wall of this tube may form the forward boundary of the adjacent slot or orifice 52.

During starting and low speed operation of the power plant the propellent gases of combustion and air under pressure discharge from the second stage rotor blades 42 in the direction indicated by the arrows X in Figure 5. Under such conditions air under pressure discharges through the slots 52 as well as through the slots 53 to flow rearwardly across the blade surfaces together with the propellent gases as indicated by the arrows at the slots in Figure 5. However, during medium and high speed operation of the power plant the propellent gases stream from the second stage rotor blades 42 substantially in the direction indicated by the arrows Y in Figure 6. Under these conditions the propellent gases enter the slots 53 and flow transversely through the blade passages 51 to discharge through the slots 53 together with the air under pressure delivered by the passages 51. This action is indicated by the arrows at the slots 52 and 53 in Figure 6. The exact direction of the arrows X and Y, representing direction of gas flow, will vary according to the row of stator vanes chosen for air-fuel injection, but the illustrated case is representative for third stage stators in a turbine of four stages.

The above-mentioned tubular portions or tubes 54 at the leading edge portions of the blades 430 receive fuel from a fuel manifold 55 at the exterior of the turbine. In practice the tubes 54 or extensions thereon pass radially outward through the turbine wall to connect with the manifold 55. The manifold 55 has branches 56 which deliver fuel under pressure to couplings 57 on the outer ends of the tubes 54. A row of fuel injecting or discharging orifices 58 is provided in each tube 54 to discharge the fuel into the expansion zone of the turbine 35. The orifices 58 open at the convex sides of the blades 430 immediately adjacent their leading edges. The fuel introduced at the orifices 58 burns in the air and gas mixture flowing through the expansion zone of the turbine to increase the power output of the engine at higher rotative speed, and the injected air produces a beneficial volumetric filling effect in the latter stages of the turbine during relatively low speed operation.

In the form of the invention illustrated in Figure 1 where the by-passed compressed air is discharged into the tail pipe 60 the space 50 at the roots of the blades 430 may be closed and the slots 52 and 53 may be omitted. However, the fuel injecting tubes 54 and their orifices 58 together wtih the manifold 55, etc., remain as above described for the injection of intermediate fuel into the expansion zone of the turbine 35.

The power plant further includes the tail pipe or exhaust pipe 60 which leads from the rear end of the turbine housing 39 to the propulsive nozzle N. The nozzle N is shown in Figure 1 in a rather diagrammatic manner, it being apparent that any appropriate propulsive nozzle may be employed although a variable area type will generally be preferred, as later discussed in connection with Figure 7. The tail pipe 60 is of substantial length and the portion of the pipe adjacent the turbine 35 is employed as a supplemental combustion chamber when additional thrust is required. Means is provided for introducing fuel into this supplemental combustion chamber. In the drawings I have shown a pipe 61 extending rearwardly through the second stage compressor rotor 18 and the turbine shaft 41 to the apex end of the turbine rotor 40. The pipe 61 passes through a packing gland 9 in the forward portion of the compressor rotor 18 and continues outwardly through the wall of the housing 10 to connect with the fuel supply and control system to be subsequently described. The rear end of the pipe 61 discharges into radial ports 62 in the apex of the turbine rotor 40 which in turn discharge into a cap 63 on the rotor. A circular row of ports 64 in the cap 63 injects the fuel under pressure rearwardly and laterally into the supplemental combustion chamber. The fuel thus injected from the apex of the turbine rotor is thoroughly admixed with the air and combustion gases exhausting from the turbine 35.

In the embodiment of the inventoin illustrated in Figures 1 and 2 the compressed by-pass system includes one or more by-pass ducts 65 leading from an intermediate point or zone of the compressor means 11—12 to the tail pipe 60. The particular structure illustrated has two substantially diametrically opposite ducts 65 extending rearwardly within the compressor housing 10 from the above described discharge passage 28 of the first stage compressor 11. The two ducts 65 communicate with only relatively short portions of the compressor passage 28 to withdraw a part of the compressed air output of the first stage compressor 11, the balance of the passage 28 being unobstructed to discharge into the intake of the second stage compressor 12. The forward portions of the by-pass ducts 65 may follow the internal wall of the housing 10 to be spaced from the compressor wall 21 and then pass outwardly through openings in the housing 10 to continue rearwardly at the exterior of the engine. The ducts 65 continue rearwardly past the combustion chamber casing 32 to connect with air discharge or injection fittings 66. The ducts 65 and their fittings 66 are preferably connected by slip-joints 67 which permit thermal expansion and contraction of the assemblies. As best shown in Figure 2 of the drawings the fittings 66 flare laterally and turn inwardly to the tail pipe 60, their broadened or flared ends being partially circular to conform to the tail pipe. While the fittings 66 are extended or flared laterally they are gradually restricted in the axial direction. The rear ends of the fittings 66 communicate with and discharge through circumferentially extending openings 68 in the wall of the tail pipe 60. The openings 68 have a considerable circumferential extent to distribute the air through the greater part of the circumference of the tail pipe 60 to assure a substantial uniform flow of the compressed air into the stream of combustion gases and air exhausting from the turbine 35. Part of the relatively cool compressed air introduced at the openings 68 tends to flow along the internal surface of the tail pipe 60 to form a protective or insulating boundary layer of air. The air admitting openings 68 are in a transverse or diametric plane adjacent but slightly rearward of the turbine 35 so that the compressed air from an intermediate point in the compressor system 11—12 is discharged into the supplemental combustion chamber region above described.

A valve 69 is provided in each duct 65 to regulate the compressed air flow therethrough. I prefer to employ streamlined butterfly valves 69 that are slightly unbalanced in the downstream direction to be responsive to air flow through the ducts. The unbalancing of the streamlined valves 69 is such that the valves tend to move to the open position in response to air flow through the ducts 65. The valves 69 are operated or controlled by the manually regulable automatic control system to be subsequently described.

In the construction illustrated in Figures 3 to 6 inclusive, the compressed air withdrawn or by-passed from the intermediate point in the compressor system 11—12 is introduced into the expansion zone of the turbine 35 at the above-described stator blades 430. In this case the by-pass ducts 65 connect with fittings 70 at the turbine 35. Slip-joints 71 between the ducts 65 and the fittings 70 provide for thermal expansion and contraction of the duct assemblies. The fittings 70 are similar to the fittings 66 previously described, being flared or broadened to engage a substantial distance around the turbine casing 39. The rear ends of the fittings 70 may be secured to raised bosses or seats 72 on the casing 39 and a series of circumferentially spaced openings 73 extend through the seats 72 and the wall of the casing 39 to communicate with the interiors of the fittings. The openings 73 serve to connect the above-described annular space 50 with the by-pass duct fittings 70 so that the compressed air is supplied to the space 50 at a multiplicity of points. This air flows through the internal passages 51 of the blades 430 to discharge from the slots 52 and 53 and the tips of the blades as hereinabove described. The by-pass ducts 65 employed in the construction of Figures 3 and 4 are equipped with the valves 69 for controlling the diversion of compressed air from the intermediate points in the compressor system to the expansion zone of the turbine 35. The fuel tubes 54 of the blades 430 may pass radially outward through the space 50, the openings 73 and the wall of the fittings 70 to the couplings 57 as shown in Figure 3.

The control system of the invention serves to govern the delivery of fuel to the primary combustion chamber fuel jets 36, and fuel tubes 54 of the blades 430 and the pipe 61 for supplying fuel to the supplemental fuel orifices 64 and the system operates to automatically regulate the valves 69 of the compressed air by-pass ducts 65 to maintain the volumetric flow entering the second compressor 12 at a value substantially proportional to the rotative speed of the compressor 12 during changes in velocity of flight at constant altitude and during changes in flight altitude. The fuel supply and control organization of the system includes a suitable fuel tank 75 and a motor driven pump 76 for pumping fuel from the tank through a main supply line 77. A fuel conduit or line 78 leads to the primary fuel injecting manifold 37, a similar line 79 leads to the intermediate fuel injecting manifold 55 and a third fuel line 80 extends to the pipe 61 of the supplemental fuel supply means. Remotely controlled valves A, B and C are connected between the main fuel supply pipe 77 and the respective lines 78, 79 and 80.

The three valve mechanisms A, B and C may be identical and corresponding reference numerals are applied to corresponding parts of the same. Each valve includes a pair of aligned cylinders 81 and 82 and a piston rod 83 extending into opposite ends of the cylinders. Pistons 84 and 85 are secured on the rods 83 and operate in the cylinders 81 and 82 respectively. The cylinders 81 serve to pass or conduct fuel and are connected in the fuel lines 78, 79 and 80. Thus corresponding ends of the cylinders 81 have independent communication with the fuel supply pipe 77 while the other ends of the cylinders have outlet ports 86, 87 and 88 respectively discharging into the lines 78, 79 and 80. Needle valves 90 are carried by the rods 83 or pistons 84 and are adapted to cooperate with the related ports 86, 87 and 88 to control the fuel flow to the lines 78, 79 and 80 respectively. The ports 86, 87 and 88 are preferably shaped to properly receive the needle valves 90. The pistons 84 are received in the cylinders 81 with large sidewall clearance to permit the flow of the liquid fuel past or around the pistons for the purpose to be later described. Accordingly, the hydraulic force imposed upon the pistons 84 tending to close the valves 90 is responsive to the rate of flow of fuel past the pistons 84.

The cylinders 82 with their pistons 85 constitute the remotely controlled actuators of the valves A, B and C. Air under pressure from the compressor system 11—12 of the power plant may serve as the actuating medium pressing upon the pistons 85 to open the fuel valves 90. In Figures 1 and 7 I have shown a pipe or line 91 leading from the discharge passage 30 of the second stage compressor 12 and carrying the air under pressure for the actuation of the valves A, B and C. The air pressure line 91 has two branches 92 and 93, the branch 92 extending to the inner end of the cylinder 82 of the valve A and the branch 93 extending to the inner ends of the cylinders 82 of the valves B and C. The delivery of air pressure to the valve actuating pistons 85 is controlled by a manually and automatically operable pressure bleed system and to insure a desired independent operation of the valves B and C it is preferred to incorporate restrictions 94 in the parts of the line 93 extending to the cylinders 82 of the valves B and C so that bleeding of pressure from one or both of the cylinders of valves B and C does not appreciably affect the pressure in the other cylinder, or in certain other parts of the pneumatic system to be described later. The pressure line 92 of the valve A has an extension or branch 95 extending to a manually regulated bleed valve D. A pressure bleed line 96 extends from the cylinder 82 of the fuel control valve B to a bleed valve E and a similar bleed line 97 extends from the cylinder 82 of the valve C to a bleed valve F. The bleed valves D, E and F may be identical and reference numerals are applied to their corresponding parts.

Each pressure bleed valve D, E and F includes a cylinder 98 and a piston 99 operable in the cylinder. Each cylinder 98 has a lateral bleed port 100 and the pistons 99 are movable between positions where they close the ports 100 and positions where the ports are open. The lines or pipes 95, 96 and 97 from the actuating cylinders 82 of the valves A, B and C communicate with their respective cylinders 98 at points spaced axially from the bleed ports 100 being in communication with the ends of the cylinders while the ports 100 are spaced inwardly from the cylinder ends. In the preferred form of the invention a single manually movable lever, or the equivalent, serves to actuate or regulate the valves D, E and F. As shown in Figure 7 this manually actuated member is in the form of a lever 101 associated with a rotatable cam 102 so as to turn or rotate the same. The cam 102 turns within a substantially cylindrical or arcuate wall 103 which has spaced openings 104 receiving cam followers 105. The followers 105 cooperate with the active surface of the cam 102 and extend into the cylinders 98. Flanges or heads 106 are provided on the followers 105 to operate in the cylinders 98 and coiled compression springs 107 are engaged between the follower heads and the pistons 99 to transmit movement from the followers to the pistons. The profile of the cam 102 is such that the cam is turnable between a "power off" position where the bleed ports 100 of the three valves D, E and F are all open and a "full power" position where the ports 100 of the three valves are closed. The cam 102 is such that the follower 105 of the valve D may be operated individually to control or close the port 100 and is such that further movement of the lever 101 results in successive operation of the valves E and F to close their bleed ports 100 while maintaining the valve D actuated. Reverse movement of the lever 101 from the full power position first results in opening up the port 100 of the valve F, then causes opening of the port 100 of the valve E and finally allows opening of the port 100 of the valve D. During this return movement of the cam 102 the air pressure acting on the pistons 99 moves the pistons to the position where they uncover the ports 100.

From the foregoing it will be seen that the delivery or injection of fuel into the primary combustion chamber 31, the intermediate fuel tubes 54 and the supplemental fuel orifices 64 is controllable by the manual lever 101. When the cam 102 is turned to a position where it actuates the piston 99 of the valve D outwardly, the port 100 is closed or partially closed and air pressure builds up in the inner end of the cylinder 82 of the valve A to move the piston 85 against the force exerted on the piston 84 by the fuel under pressure. This movement of the pistons 84 and 85 retracts the needle valve 90 from the port 86 to permit the flow of fluid or an increased flow of fuel to the primary combustion chamber 31. When the control or throttle lever 101 is moved to a position where air pressure in the cylinder 98 of the valve D shifts the piston 99 clear of or partially clear of the port 100, pressure in the inner end of the cylinder 82 of valve A is reduced and fuel under pressure acting on the piston 84 of valve A moves the needle valve 90 toward the port 86 to restrict or cut off the flow of fuel to the primary combustion chamber 31. The cam 102 operates the bleed valves E and F in the same manner to control their related or respective fuel control valves B and C. Accordingly, the lever 101 may be operated to separately control the injection of fuel into the primary combustion chamber 31 and when additional thrust or power output is desired, the lever 101 may be operated to provide for the introduction of fuel into the expansion zone of the turbine 35 and then into the supplemental combustion chamber. With the primary combustion fuel system bleed valve D fully closed, the valve E may be regulated by manipulation of the lever 101 to vary the introduction of fuel into the expansion zone of the turbine, and with the valves D and E fully closed the lever 101 may be operated to vary or regulate the introduction of fuel into the supplemental combustion chamber.

In accordance with the invention the injection of fuel into the primary combustion chamber 31 is controlled or regulated by a means responsive to the rotational speed of the turbine 35 and compressors 11 and 12. A valve 107 is interposed in the above-described air pressure line 92 of the primary fuel control valve A. The valve 107 may be of the piston type to include a cylinder 108 and a piston 109 operable in the cylinder. The cylinder 108 is connected in the line 92 to have the upstream section of the line communicate with an end of the cylinder and to have the downstream section of the line connect with a port 110 spaced axially from said end of the cylinder. The piston 109 is movable in the cylinder 108 to control the port 110, being urged to an open position clear of the port by the air pressure admitted to said end of the cylinder. The above-mentioned rotational speed responsive means may take the form of a fly-ball governor 111 driven by one of the above-described radial shafts 27 of the engine and arranged to cooperate with a projecting end of the valve piston 109. The parts are related so that upon an increase in the speed of rotation of the turbine rotor 40, the governor 111 urges the piston 109 inwardly, tending to close the port 110. On the other hand the air under pressure admitted to the cylinder 108 from the upstream end of the line 92 urges the piston 109 to the open position. The action of the governor 111 in restricting the port 110 upon an increase in the rotational speed of the power plant reduces the flow of air under pressure to the cylinder 82 of the valve A so that the fuel under pressure flowing through the cylinder 81 of the valve A urges the needle 90 toward the closed position to restrict the delivery of fuel to the primary combustion chamber 31. It will be observed that this speed responsive control of the primary combustion chamber fuel injection system does not affect the delivery of fuel to the expansion zone of the turbine 35 or to the supplemental combustion chamber.

The control system further includes a temperature responsive means for controlling the air-fuel ratio at the several points or zones of fuel injection and for limiting the temperature developed in the primary combustion chamber 31 and turbine 35. This temperature responsive means includes a vave 112 for controlling the actuating air pressure supply line 91. The valve 112 may be of the needle type arranged to control a port 113 in a valve body or case 114 interposed in the air pressure line 91. A compression spring 115 is arranged to urge the valve 112 toward the closed position and an actuating lever 118 is connected with the projecting portion of the valve. The temperature responsive means further includes a suitable thermostat located in the primary combustion chamber 31 or in a hot portion of the turbine 35. In the particular case illustrated the thermostat is arranged to extend into the combustion chamber 31 and comprises a heat resistant tube 116 having a substantial coefficient of thermal expansion and a rod 117 of silica, or the like, having a low coefficient of expansion secured to the inner end of the tube. The inner end of the tube 116 is closed while the outer end of the tube is open. The rod 117 passes outwardly through the open outer end of the tube 116 and cooperates with the lever 118. The parts are constructed and related so that upon expansion of the tube 116, resulting from an increase in combustion chamber temperature, the rod 117 moves inwardly and the spring 115 pivots the lever 118 and moves the valve 112 toward the closed position. Such restriction of the port 113 reduces the air pressure in the lines 92 and 93 and in the cylinders 82 so that valves A, B and C operate to reduce the rate of fuel delivery to their respective fuel injectors. Conversely, upon a reduction in combustion chamber temperature the thermostat tube 116 contracts and the rod 117 moves outwardly to pivot the lever 118 against the action of the spring 115. This moves the valve 112 away from its port 113 admitting an increased flow of air pressure to the lines 92 and 93 and to the cylinders 82 so that the valves A, B and C provide for an increased flow of fuel to their respective fuel injectors. From the foregoing it will be seen that the temperature responsive means operates to automatically limit the temperature developed in the engine, serving to maintain the temperature within a safe and practical range.

It is a feature of the invention that the above-described valves 69 which control the compressed air bleed or by-pass ducts 65 are associated with and automatically operated by the above-described manually controlled bleed valve D and the temperature responsive means. Each valve 69 is equipped with a lever 120 operated by a servo-motor. As diagrammatically illustrated in Figure 7 the servo-motors are of the diaphragm type, comprising chambers 121 and flexible diaphragms 122 extending across the mouths of the chambers. Rods 123 on the diaphragms 122 are pivotally connected with the adjacent or related valve lever 120. A pipe or line 124 branches from the above-described air pressure line 92 of the primary fuel control valve A and extends to the diaphragm chambers 121 to supply air pressure thereto. The line 124 communicates with the line 92 at the upstream side of the rotational speed responsive valve 107 so that the by-pass valves 69 are influenced or affected by operation of the speed responsive means 107 so the positions of the valves 69, or the operative areas of the ducts 65 as determined by the valves 69, are a function of the rotational speed. Furthermore, it will be seen that closing of the bleed valve D by the cam 102 increases the effective air pressure in the lines 92 and 124. As above described, this results in increased opening of the primary fuel control valve A and further serves to flex the diaphragms 122 outwardly to move the by-pass valves 69 toward the closed position. Conversely, when the bleed valve D is open, the pressure in the lines 92 and 124 is reduced and the diaphragms 122 flex inwardly to move the valves 69 toward the open position. As a result the valves 69 of the by-pass ducts 65 progressively open as the primary combustion chamber fuel flow setting is reduced below the value for full primary fuel injection. This provides for an increased diversion of compressed air from the intermediate point in the compressor system 11—12 to the turbine expansion zone or tail pipe at periods of low primary fuel consumption.

It is believed that the operation of the system of the invention will be understood from the foregoing detailed description wherein the mode of operation of its several components is fully described. With the power plant in operation the manual lever 101 may be shifted or adjusted at will to vary primary combustion chamber fuel injection and to provide for the introduction of fuel into the expansion zone of the turbine 35 and when desired into the supplemental combustion chamber of the tail pipe 60. The thermostatically operated valve 112 serves to limit the temperature developed in the primary combustion chamber 31 and therefore governs the air-fuel ratio in the combustion chamber. The valve 112 controls the main air pressure supply line 91 and therefore has an overriding control function affecting the operation of the three fuel metering or control valves A, B and C to limit the temperature to specified maximum values at each of the three points of fuel injection into the power plant. The rotational speed responsive valve 107 controls the delivery of actuating air pressure to the metering valve A and to the servo-motors 121—122 which adjust or operate the by-pass valves 69. Accordingly, the valve 107 operates to govern the injection of fuel into the primary combustion chamber 31 to limit rotational speed of the power plant element and further operates to regulate the effective area of the by-pass ducts 65 so that the latter is a function of power plant rotational speed. The pressure bleed valve D is manually regulable by the lever 101 to adjust or control the fuel metering valve A. This function is performed by bleeding a greater or less amount of air pressure from the line 92. As above described the servo-motors 121—122 of the by-pass valves 69 are supplied with control or actuating air pressure by the line 92 so that the valve D controlled by the manual lever 101 in turn adjusts the position of the valves 69. Accordingly, the valves 69 are progressively opened as the lever 101 is moved to reduce the fuel delivery setting below the value for full primary fuel injection. Conversely, the valves 69 are moved toward the closed position when the lever 101 is moved in the direction to increase the rate of fuel injection. The automatic operation or regulation of the valves 69 in the by-pass ducts 65 in conjunction with the functioning of the other elements of the system maintains a substantially correct Q/N ratio preventing overloading of the first stage compressor 11 and turbining of the second stage compressor 12 at low altitudes and providing for substantially full delivery of compressed air from both compressors 11 and 12 to the primary combustion chamber 31 when the conditions that bring about such overloading and turbining no longer prevail. The energy involved in compressing the air that is by-passed through the ducts 65 is not lost but is recovered at least to a large degree by reintroducing the air under pressure into the expansion zone of the turbine 35 or into the tail pipe 60 to add to the stream of propulsive gases ejected from the nozzle N to form the thrust producing jet.

Since the volumetric flow conditions of the gases in the tail pipe 60 will necessarily vary widely as a result of the automatic selectivity of the relative amounts of fuel injection and air injection at several points in the power plant, as above described, it is found that provision for automatically varying the effective opening of the propulsive nozzle N further produces a beneficial effect upon performance of the power plant, especially when wide ranges of altitudes and airplane speeds are to be negotiated.

In Figure 7 I have shown a suitable control device for the propulsive nozzle N when the latter is of supersonic contour. An annular throat member 137 of streamlined shape supported upon piston rods 136 is axially positioned or moved by pistons 133 operable in cylinders 138 so as to vary the throat area of the supersonic nozzle. The upstream ends 134 of the cylinders 138 are exposed to throat pressures of the nozzle N by orifices 135 while the downstream ends 132 of the cylinders 138 are exposed through a pipe 131 to the pressures in the forward portion 130 of the tail pipe 60.

The operation of the variable area nozzle device is that the throat member 137 tends to close or move rearwardly under the influence of the propulsive stream flow. However, an excessive restriction of the nozzle throat is averted by pressure differential existing at the orifices 135 and the tail pipe portion 130 acting upon the pistons 133 to urge the throat member 137 to the open or forward position. To accomplish this the orifices 135 are located approximately at the region of the propulsive nozzle N which combines with the throat member 137 to form a point of minimum cross sectional flow area for the gases of combustion in order that these orifices may be influenced by the comparatively abrupt pressure drop which occurs immediately downstream from the point of attainment of sonic velocity. Then if the throat member 137 should tend to close more than it should, the resultant upstream movement of the plane of sonic velocity will traverse the orifices 135 abruptly reducing the pressure in the cylinder ends 134 and restoring the throat member 137 to the correct position. When the foregoing provisions are made, the throat member 137 tends to assume a position of equilibrium which has been found to barely maintain throat sonic velocity as desired in the supersonic nozzle throat for optimum performance and yet the degree of closure of the throat area is prevented from producing a choking condition or excessive flow restriction.

Having described only a typical preferred form and application of the invention, I do not wish to be limited or restricted to the specific details set forth but wish to reserve to myself any features or modifications that may fall within the scope of the following claims.

I claim:

1. In a power plant having a compressor system, a combustion chamber receiving compressed air from said system, and a turbine driven by the hot gases discharged from the chamber; the combination of a duct for bleeding compressed air from an intermediate portion of said compressor system, a fuel system for introducing fuel into said chamber and including a fuel control valve, a valve for controlling said duct, and a manually controllable means for effecting simultaneous operation of said valves comprising a conduit system conducting an actuating pressure fluid, a servo-motor for operating the fuel control valve and connected in said conduit system to be operated by the pressure therein, a servo-motor for operating the duct controlling valve and connected in said conduit system to be operated by the pressure therein, a master valve in said conduit system for regulating the pressure therein and thereby simultaneously operate the fuel control valve and the duct controlling valve, and manual means for operating the master valve.

2. In a power plant having a compressor system, a combustion chamber receiving compressed air from the compressor system and a turbine driven by hot gases discharged from the chamber; the combination of a duct for bleeding compressed air from an intermediate portion of said compressor system, a fuel system for introducing fuel under pressure into said chamber and including a line for conducting the fuel to said chamber, a valve for controlling said line, a cylinder interposed in said line, and a piston in said cylinder connected with the valve and acted upon by the fuel flowing to said chamber to urge the valve to the closed position, a valve in said duct urged toward the open position by the air flow through the duct, and control means comprising a servo-motor for urging the first named valve to the open position, a servo-motor for urging the second named valve to the closed position, a system for conducting actuating fluid pressure to the servo-motors, and a manually operable control for bleeding fluid pressure from the last mentioned system to cause simultaneous movement of said first named valve toward the closed position and movement of said second named valve toward the open position.

3. In a power plant having a compressor system, a combustion chamber receiving compressed air from said system, and a turbine driven by the hot gases from the combustion chamber and including a casing, and a bladed rotor operable in the casing to drive the compressor system; the combination of stator blades in the casing having air passages discharging into the casing, means on the leading edges of said blades for injecting fuel into the casing, and duct means for carrying compressed air from an intermediate portion of the compressor system to said passages for discharge into the casing.

4. In a power plant having a compressor system, a combustion chamber receiving compressed air from said system, and a turbine driven by the hot gases from the combustion chamber and including a casing, and a bladed rotor operable in the casing to drive the compressor system; the combination of stator blades in the casing having internal air passages and air discharge openings communicating with said passages and extending through the leading edge parts of the blades to the opposite sides of the blades to discharge into the casing, duct means for carrying compressed air from an intermediate portion of the compressor system to said passages for discharge from said openings, fuel injectors on the leading edges of the blades, and means for supplying fuel to the injectors.

5. In a power plant having a compressor system, a combustion chamber receiving compressed air from said system, and a turbine driven by the hot gases from the combustion chamber and including a casing, and a bladed rotor operable in the casing to drive the compressor system; the combination of stator blades in the casing having internal air passages leading to the tips of the blades where they discharge into the casing and having air discharge openings extending through the leading edge parts of the blades from said passages to the opposite sides of the blades adjacent the leading edges thereof to discharge into the casing, duct means for carrying compressed air from an intermediate portion of the compressor system to said passages for discharge from said openings, fuel injectors on the leading edges of the blades, and means for supplying fuel to the injectors.

6. In a power plant having a compressor system, a combustion chamber receiving compressed air from said system, and a turbine driven by the hot gases from the combustion chamber and including a casing, and a bladed rotor operable in the casing to drive the compressor system; the combination of rows of stator blades in the casing, the blades of at least one row having internal air passages and air discharge openings extending from said passages to the opposite sides of the blades adjacent the leading edges thereof to discharge into the casing, fuel injectors on the leading edges of the blades of said row, and means for supplying fuel to said injectors, and duct means for carrying compressed air from an intermediate portion of the compressor system to said passages for discharge from said openings.

7. In a power plant having a compressor system, a combustion chamber receiving the compressed air from said system, and a turbine unit including a casing, a rotor in the casing driven by hot gases from said chamber and driving the compressor system, and a tail pipe extending rearwardly from the rear end of the casing for exhausting the gases from the casing; the combination of means for injecting fuel from the rear end of the rotor into the tail pipe adjacent the rear end of the casing, duct means for carrying compressed air from an intermediate portion of the compressor to said portion of the tail pipe adjacent the casing and discharging the compressed air into said exhaust gases at said rear end of the casing in a plane adjacent and slightly rearward of the point of injection of fuel into the tail pipe, and valve means for controlling the duct means.

8. A control and fuel system for a power plant having multi-stage compressor means, a combustion chamber receiving compressed air therefrom, and a turbine driven by hot gases received from the chamber and driving the compressor means, said system including a duct for bleeding compressed air from an intermediate portion of the compressor, a fuel line for carrying fuel to the combustion chamber, a metering valve controlling the fuel line, a valve for said duct, and a single control for said valves including fluid pressure actuated means for operating the metering valve, fluid pressure actuated means for operating the duct valve, and a manually operable valve for controlling the application of actuating fluid pressure to both of said fluid pressure actuated means.

9. A control and fuel system for a power plant having multi-stage compressor means, a combustion chamber receiving compressed air therefrom, and a turbine driven by hot gases received from the chamber and driving the compressor means, said system including a duct for carrying compressed air from an intermediate portion of the compressor to the turbine for introduction thereinto, a fuel line for carrying fuel to the combustion chamber, a fuel line for carrying fuel to the turbine for introduction thereinto, a metering valve for each of said fuel lines, fluid pressure actuated means for operating the metering valves, a valve for said duct, fluid pressure actuated means for operating the duct valve, and manually operable means for controlling the application of actuating fluid pressure to the three fluid pressure actuated means.

10. A control and fuel system for a power plant having multi-stage compressor means, a combustion chamber receiving compressed air therefrom, and a turbine driven by hot gases received from the chamber and driving the compressor means, said system including a duct for bleeding compressed air from an intermediate portion of the compressor, a fuel line for carrying fuel to the combustion chamber, a metering valve controlling the fuel line, a valve for said duct, and a single control for said valves including fluid pressure actuated means for operating the metering valve, fluid pressure actuated means for operating the duct valve, means responsive to the temperatures in the combustion chamber for controlling the application of actuating fluid to both of said fluid pressure actuated means, and a manually operable valve for controlling the application of actuating fluid pressure to both of said fluid pressure actuated means.

11. A control and fuel system for a power plant having multi-stage compressor means, a combustion chamber receiving compressed air therefrom, and a turbine driven by hot gases received from the chamber and driving the compressor means, said system including a duct for bleeding compressed air from an intermediate portion of the compressor, a valve for controlling the duct, an operating means for the valve, a manually operable control acting directly upon the operating means, and means responsive to the rotational speed of the turbine and compressor for regulating said operating means.

12. In a power plant having a compressor system, a combustion chamber receiving compressed air from said system, a turbine unit including a turbine driven by the hot gases from the combustion chamber and a tail pipe for exhausting the gases from the turbine; the combination of means for introducing fuel into the tail pipe, the combustion of the fuel from said means in the tail pipe causing variations in the volumetric flow and pressure in the tail pipe under different conditions of operation, a propulsive nozzle for the outlet of the tail pipe, a member movable in the nozzle to vary the effective flow passage area thereof, and means operable in response to the differentials in pressure in the nozzle and a point in the tail pipe adjacent the region of introduction of fuel therein by said fuel introducing means for moving the member including a cylinder and piston device for moving the member, the cylinder of said device having one end in communication with the nozzle, and a pipe having one end in communication with the other end of the cylinder and having its other end in communication with the tail pipe at said point.

NATHAN C. PRICE.

References Cited in the file of this patent

UNITED STATES PATENTS

| Number | Name | Date |
|---|---|---|
| 1,111,498 | Rotter | Sept. 22, 1914 |
| 2,112,391 | Anxionnaz | Mar. 29, 1938 |
| 2,149,510 | Darrieus | Mar. 7, 1939 |
| 2,219,994 | Jung | Oct. 29, 1940 |
| 2,236,426 | Faber | Mar. 25, 1941 |
| 2,238,905 | Lysholm | Apr. 22, 1941 |
| 2,243,467 | Jendrassik | May 27, 1941 |
| 2,297,446 | Zellbeck et al. | Sept. 29, 1942 |
| 2,356,557 | Anxionnaz et al. | Aug. 22, 1944 |
| 2,402,363 | Bradbury | June 18, 1946 |
| 2,404,767 | Heppner | July 23, 1946 |
| 2,458,600 | Imbert et al. | Jan. 11, 1949 |
| 2,464,724 | Sédille | Mar. 15, 1949 |
| 2,487,588 | Price | Nov. 8, 1949 |
| 2,489,683 | Stolker | Nov. 29, 1949 |
| 2,520,434 | Robson | Aug. 29, 1950 |
| 2,566,961 | Poole | Sept. 4, 1951 |

FOREIGN PATENTS

| Number | Country | Date |
|---|---|---|
| 586,710 | Great Britain | Mar. 28, 1947 |
| 919,004 | France | Nov. 18, 1946 |